United States Patent
Lee et al.

(10) Patent No.: US 8,380,384 B2
(45) Date of Patent: Feb. 19, 2013

(54) APPARATUS AND METHOD FOR LOCALIZING MOBILE ROBOT

(75) Inventors: Su-Jinn Lee, Yongin-si (KR); Woo-Yeon Jeong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 405 days.

(21) Appl. No.: 12/382,681

(22) Filed: Mar. 20, 2009

(65) Prior Publication Data

US 2010/0070125 A1    Mar. 18, 2010

(30) Foreign Application Priority Data

Sep. 12, 2008    (KR) .................. 10-2008-0090292

(51) Int. Cl.
 *G01C 22/00* (2006.01)
 *G06F 19/00* (2011.01)
(52) U.S. Cl. .................. 701/28; 700/245
(58) Field of Classification Search .............. 700/245, 700/259, 253, 258, 262; 701/28, 23; 901/1, 901/47, 50; 348/61, E7.086; 702/181, 153; 345/474
See application file for complete search history.

(56) References Cited

U.S. PATENT DOCUMENTS

| | | | | |
|---|---|---|---|---|
| 2001/0037163 | A1* | 11/2001 | Allard | 700/245 |
| 2005/0234679 | A1* | 10/2005 | Karlsson | 702/181 |
| 2006/0293810 | A1* | 12/2006 | Nakamoto | 701/28 |
| 2009/0312871 | A1* | 12/2009 | Lee et al. | 700/259 |
| 2011/0172822 | A1* | 7/2011 | Ziegler et al. | 700/259 |

FOREIGN PATENT DOCUMENTS

| | | |
|---|---|---|
| JP | 02-143309 | 6/1990 |
| JP | 2007-316966 | 12/2007 |
| KR | 10-2003-0026497 | 4/2003 |
| KR | 10-2004-0071999 | 8/2004 |
| KR | 10-2005-0011053 | 1/2005 |
| KR | 10-2005-0108923 | 11/2005 |
| KR | 10-2007-0109592 | 11/2007 |

\* cited by examiner

*Primary Examiner* — James Trammell
*Assistant Examiner* — Muhammad Shafi
(74) *Attorney, Agent, or Firm* — Staas & Halsey LLP

(57) ABSTRACT

An apparatus and method for localizing a mobile robot are provided. The method includes building a forward image map including features extracted according to position at which the mobile robot takes forward images and feature descriptors of the extracted features, and localizing the mobile robot on the basis of features extracted from a newly input forward image and the built forward image map.

16 Claims, 6 Drawing Sheets

◻ : CEILING IMAGE FEATURE
◁ : PARTICLE
▲ : POSITION OF ROBOT AT WHICH FORWARD IMAGE FEATURE IS REGISTERED
▲ : POSITION OF ROBOT ESTIMATED FROM CEILING IMAGE FEATURE

APPARATUS AND METHOD FOR LOCALIZING MOBILE ROBOT

CROSS-REFERENCE TO RELATED APPLICATIONS

This application claims priority from Korean Patent Application No. 10-2008-0090292, filed on Sep. 12, 2008, the disclosure of which is incorporated herein in its entirety by reference.

BACKGROUND

1. Field

One or more embodiments within the following description relate to an apparatus and method for localizing a mobile robot.

2. Description of the Related Art

A potentially fundamental function of an autonomous mobile robot is to move to a destination without collision. This function may be achieved using a localization technique and a mapping technique performed by the autonomous mobile robot. The autonomous mobile robot uses a simultaneous localization and mapping (SLAM) algorithm to localize itself and build a map. According to the SLAM algorithm, a process of building a map of the surroundings at some position and localizing a moved robot on the basis of the built map is repeated to simultaneously estimate the position of the robot and relative positions of the robot's surroundings.

A SLAM technique using a ceiling image shows excellent localization performance using only one camera looking at the ceiling. However, when a relocation process, which includes moving a robot to a new position and estimating the position of the robot on a map, is performed after the entire map is built; it is difficult to localize the robot without information on its initial position.

SUMMARY

One or more embodiments of the following description relate to a localization apparatus and method having high localization performance even when localization using a ceiling image is difficult.

One or more embodiments of the following description also relate to a localization apparatus and method capable of improving localization performance using a forward image and a ceiling image.

Additional aspects, features, and/or advantages of example embodiments will be set forth in part in the description which follows and, in part, will be apparent from the description, or may be learned by practice of the disclosure.

According to an embodiment, there is provided an apparatus for localizing a mobile robot including a forward image map processor for building a forward image map including features extracted from forward images obtained by the mobile robot according to position at which the forward images are taken and feature descriptors of the extracted features, and a localizer for, when a new forward image is input, localizing the mobile robot on the basis of a feature extracted from the new forward image and the forward image map.

The forward image map processor may search the forward image map for a feature of the previous forward images matching the feature extracted from the new forward image and information on a position at which a previous forward image including the matching feature is taken, and calculate an estimated position of the mobile robot using the search result. The forward image map processor may update the forward image map when the mobile robot moves a specific distance. The features extracted from the forward images may be extracted regardless of scale.

The forward image map processor may compare a size of the searched feature of the previous forward image with a size of the extracted feature and correct the estimated position of the mobile robot, and the localizer may give weights to particles on the basis of the corrected estimated position.

The localizer may set particles, which are samples indicating virtual positions of the mobile robot, give weights to the particles on the basis of the estimated position, and re-sample the particles on the basis of the weights given to the particles. The localizer may increase weights of particles existing within a specific range from the estimated position of the mobile robot and having an angle difference of a specific value or less from a heading angle of the mobile robot.

The apparatus may further include a ceiling simultaneous localization and mapping (SLAM) performer for performing localization and map building on the basis of ceiling images. Here, the ceiling SLAM performer may include: a ceiling feature processor for extracting features from the ceiling images and generating feature descriptors of the extracted features, and a ceiling image map builder for building a ceiling image map on the basis of information on the extracted ceiling image features.

The ceiling SLAM performer may search the ceiling image map for a ceiling image feature matching a feature extracted from a newly input ceiling image and calculate an estimated position of the mobile robot using the search result, and the localizer may give weights to particles on the basis of the estimated position of the mobile robot calculated from the feature of the forward image and the estimated position of the mobile robot calculated from the feature of the ceiling image. When the localizer gives the weights to the particles, a range of particles to which weights are given on the basis of the estimated position of the mobile robot calculated from the feature of the forward image may be larger than a range of particles to which weights are given on the basis of the estimated position of the mobile robot calculated from the feature of the ceiling image. The localizer may increase weights of particles included in an intersection set of particles to which weights are given on the basis of the estimated position of the mobile robot calculated from the feature of the forward image and particles to which weights are given on the basis of the estimated position of the mobile robot calculated from the feature of the ceiling image.

The forward image map processor may build the forward image map on the basis of the position of the mobile robot estimated on the basis of the ceiling image map built by the ceiling SLAM performer.

According to another embodiment, there is provided a method of localizing a mobile robot including building a forward image map including features extracted from forward images obtained by the mobile robot according to position at which the forward images are taken and feature descriptors of the extracted features, and when a new forward image is input, localizing the mobile robot on the basis of a feature extracted from the new forward image and the forward image map.

It is to be understood that both the foregoing general description and the following detailed description are exemplary and explanatory and are intended to provide further explanation of the embodiments as claimed.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
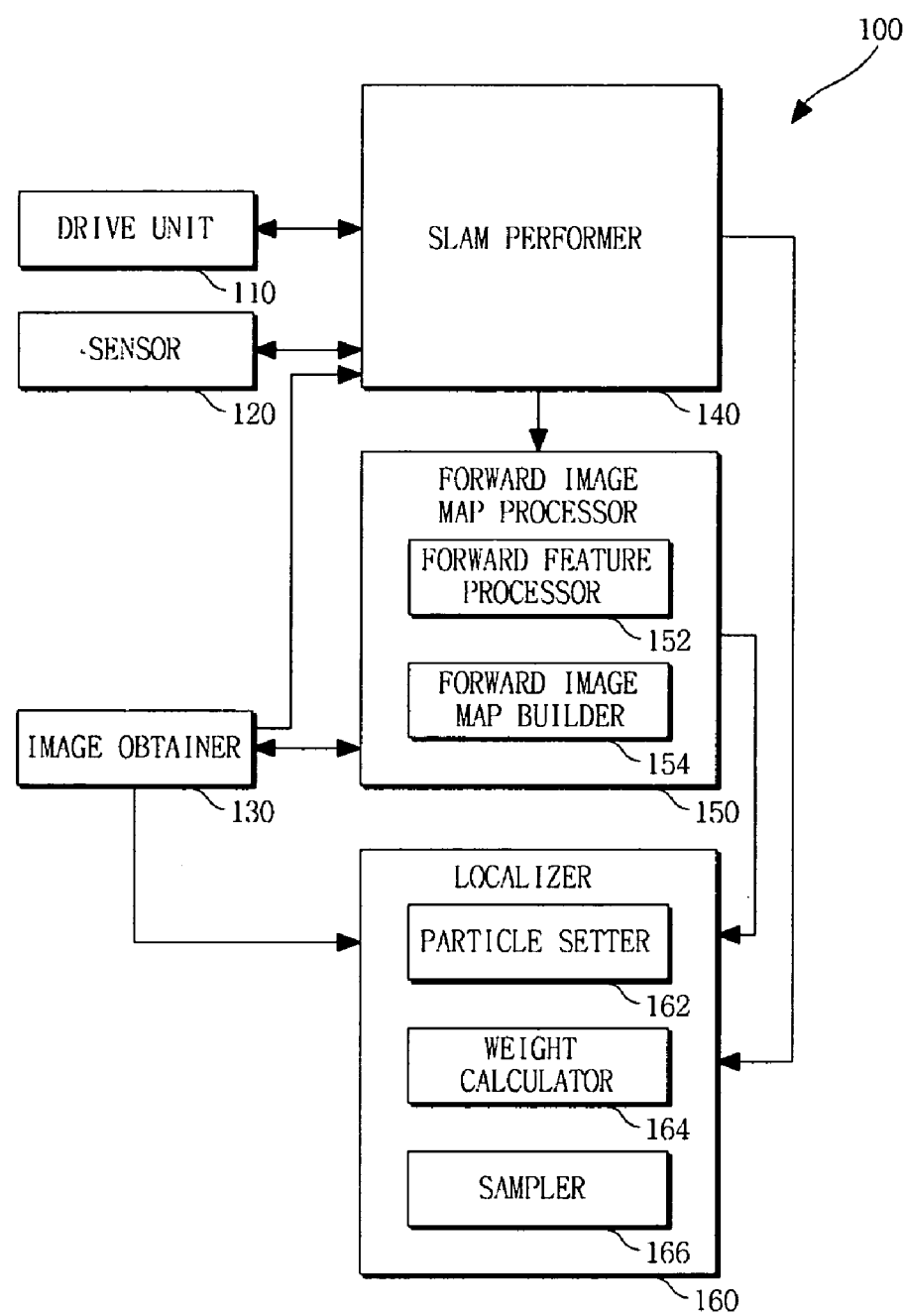
FIG. 1 is a block diagram of an apparatus for localizing a mobile robot according to an exemplary embodiment.

Reference will now be made in detail to the embodiments, examples of which are illustrated in the accompanying drawings, wherein like reference numerals refer to the like elements throughout. The embodiments are described below to explain the present disclosure by referring to the figures.

FIG. 1 is a block diagram of an apparatus 100 for localizing a mobile robot according to an exemplary embodiment.

The apparatus 100 for localizing a mobile robot according to an exemplary embodiment includes a drive unit 110, a sensor 120, an image obtainer 130, a simultaneous localization and mapping (SLAM) performer 140, a forward image map processor 150, and a localizer 160. An example in which the apparatus 100 is implemented as a mobile robot capable of moving while taking/capturing images will be described below.

The drive unit 110 may include a driving system, such as a plurality of wheels, for driving the mobile robot, and a driving source for providing driving power to the driving system.

The sensor 120 is installed in the mobile robot 100 and senses amounts of movement and turning of the mobile robot 100. To this end, the sensor 120 may include an encoder or a gyro-sensor or both. For example, the encoder integrates a moved distance and direction to estimate the current position and heading angle of the mobile robot 100 in a two-dimensional coordinate space. In general, encoders are accurate in integrating a short section, but errors accumulate as the integration operation continues. Meanwhile, the sensor 120 may include an infrared, laser or ultrasonic sensor to obtain obstacle detection information used for building an obstacle map.

The position and heading angle of the departing mobile robot 100 may be set as reference values. To estimate the position of a mobile robot is to estimate the position and heading angle of the mobile robot in a two-dimensional plane. A reference for the position of the mobile robot 100 may be a feature existing on a map. Thus, the position information of the mobile robot 100 includes the position and heading angle of the mobile robot 100 with reference to a feature recognized by the mobile robot 100.

Here, a feature is a location at which a shape can be specified, such as an edge or corner of an object. Features are the basis of map building and are also referred to as landmarks. In addition, a feature may be a line or point extracted from the outline of a closed region. For example, a line or point may be extracted from the circular or quadrangular outline of a light or lighting device, etc., in an image of an indoor ceiling and used as a feature.

The image obtainer 130 captures an external image and converts the captured image into a digital signal. The image obtainer 130 may include a charge coupled device (CCD) module or complementary metal-oxide semiconductor (CMOS) module. The image obtainer 130 can obtain forward images perpendicular to a plane in which the mobile robot 100 travels and overhead images parallel to the travel plane. In an example embodiment, a forward image is a taken/captured image of the space ahead of a direction in which the robot is traveling. The image obtainer 130 may include a camera taking forward images and a camera taking overhead images. Alternatively, a camera pointing upward may be installed in the mobile robot 100 such that the image obtainer 130 can obtain a forward image and an overhead image from an obtained image using an image transform.

Using odometry information, angular speed information, acceleration information, etc., obtained from the drive unit 110 and the sensor 120, the SLAM performer 140 provides position information on the mobile robot 100 required for the forward image map processor 150 to build a forward image map. SLAM is an algorithm whereby a process of building a map of surroundings at a position and localizing a moved robot on the basis of the built map is repeated to estimate the position of the robot and a map of surroundings simultaneously. The SLAM performer 140 can perform localization on the basis of an obstacle map or ceiling image, and may have one of various structures capable of performing localization and map building.

The SLAM performer 140 determines whether the estimated position of the mobile robot 100 is changed by a specific distance or more or a specific angle or more, and may control the forward image map processor 150 to build a forward image map every time the estimated position is changed by the specific distance or more, or the specific angle or more. When the mobile robot 100 moves only a short distance, there may be almost no difference between forward images obtained before and after movement. Thus, only when the mobile robot 100 moves the specific distance or more may the forward image map processor 150 be controlled to build a forward image map.

The forward image map processor 150 may build and store a forward image map including features extracted from forward images according to a position at which the forward images are taken by the mobile robot 100 and feature descriptors of the extracted features. A forward image map according to an exemplary embodiment may include features extracted from obtained forward images and feature descriptors whereby the respective features are identified, according to a position, e.g., a two-dimensional position, and angle at which the mobile robot 100 takes the forward images. A feature descriptor may be a feature-specific local image, directivity information on the image, or vector information on the image, whereby a feature can be identified. A storage space (not shown) storing forward image maps may be included in the forward image map processor 150 or may exist external to the forward image map processor 150.

To build a forward image map, the forward image map processor 150 may include a forward feature processor 152 and a forward image map builder 154.

An operation in which the forward image map processor 150 according to an exemplary embodiment builds a forward image map will be described below.

The forward feature processor 152 extracts features from forward images obtained from the image obtainer 130 and generates feature descriptors. In addition, the forward feature processor 152 compares the features extracted in the localization process with registered features and searches for the same features as the extracted features among the registered features. The position information of the mobile robot 100, which takes images including the same features, is used for the localizer 160 to localize the mobile robot 100 itself.

A feature extracted from a forward image has a size varying according to the position of the mobile robot 100, and thus must be extracted regardless of scale. According to an exemplary embodiment, features of forward images may be scale-invariant feature transform (SIFT) features.

The forward image map builder 154 builds a forward image map including feature descriptors of extracted features according to position at which the mobile robot 100 takes forward images. The built forward image map may include information on positions at which the mobile robot 100 takes the forward images for the respective features and information including feature descriptors.

When the mobile robot 100 does not move the specific distance or more or the specific angle or more, a forward image does not vary much. Thus, a forward image map may be built by extracting features from forward images obtained when the mobile robot 100 moves the specific distance or more, or the specific angle or more, and processing the features. In other words, when the mobile robot 100 moves the specific distance or more, or the specific angle or more, the forward image map builder 154 may build a forward image map including features and feature descriptors extracted from forward images obtained before and after movement.

A localization operation performed using a forward image map built according to an exemplary embodiment when the mobile robot 100 moves to a space included in a forward image, will be described below.

When there are previously stored forward images, the forward feature processor 152 compares features registered and stored in a previous forward image map with currently extracted features, thereby searching for matching features. Here, by comparing the feature descriptors of the previously registered features with the feature descriptors of the currently extracted features, it is possible to determine whether or not the previously registered features are the same as the currently extracted features. Thus, the forward feature processor 152 searches a forward image map for features of the previous forward images matching the features extracted from a forward image and information on positions at which forward images including features of previous images are taken, and can calculate the estimated position of the mobile robot 100 which takes the searched features.

Meanwhile, the forward feature processor 152 compares the sizes of the searched features of the previous images with the sizes of the extracted features and corrects the estimated position, thereby roughly recognizing the current position of the mobile robot 100. For example, the image size of a feature extracted from a currently input forward image is compared with the image size of a feature matching a feature extracted from a forward image map. When the image size of the extracted feature is smaller than that of the matching feature, the current position of the mobile robot 100 is farther from the feature than when the image containing the matching feature was taken. Based on this fact, the position of the mobile robot 100 can be corrected.

The localizer 160 localizes the mobile robot 100 on the basis of features extracted from input forward images and a built forward image map. The localizer 160 may localize the mobile robot 100 using a Monte-Carlo localization method of expressing probabilities that the mobile robot 100 exists at respective positions in an already-built map as particles having weights to search for a position having the highest probability.

The localizer 160 may calculate weights for a position and direction, that is, a posture of the mobile robot 100 that can be estimated using characteristics of the extracted features. The localizer 160 may then estimate an optimum posture from the calculated weights. Here, the weights are values that increase together with posture estimation accuracy. In FIG. 1, the localizer 160 is shown as a separate block from the SLAM performer 140. However, the structure of the mobile robot 100 can be variously modified and used, and the localizer 160 may be integrated with the SLAM performer 140.

As illustrated in FIG. 1, the localizer 160 may include a particle setter 162, a weight calculator 164, and a sampler 166.

The particle setter 162 sets postures of particles, which are samples indicating virtual positions of the mobile robot 100, on the basis of position (or posture) variation sensed by the sensor 120. The weight calculator 164 adjusts weights to be given to the respective particles on the basis of the extracted features. The sampler 166 re-samples the set particles on the basis of the weights given to the particles.

The sampler 166 generates a lot of particles around particles having a large weight and a few particles around particles having a small weight such that the position of the mobile robot 100 estimated using the particles and the actual position of the mobile robot 100 converge to particles at similar positions. By repeatedly performing the process of setting particles, giving weights to the particles, and re-sampling the set particles, the posture of the mobile robot 100 can be accurately estimated.

According to an exemplary embodiment, the weight calculator 164 can adjust the weights on the basis of the position of the mobile robot 100 estimated from forward image features extracted by the forward feature processor 152 from a forward image map. As mentioned above, when the estimated position of the mobile robot 100 obtained from the forward image map is corrected, weights can be given to the particles on the basis of the corrected position. To this end, the localizer 160 may increase the weights of particles which exist within a specific range from the estimated position and have an angle difference of a specific value or less from the heading angle of the mobile robot 100.

As described above in more detail, in a localization method according to an exemplary embodiment, a forward image map including feature information obtained from forward images according to a position at which a mobile robot takes the forward images is built and used, and thus localization can be performed using a forward image. For example, when the mobile robot 100 is relocated in a space after a map has been built, it may localize itself using only a ceiling image without its initial position. Here, when the movement space of the mobile robot 100 has similar ceilings or it is difficult to extract features of the ceilings, the estimated position of the mobile robot 100 converges to several points and thus localization is difficult. However, when a forward image in which a shape greatly varies according to position, in comparison with a ceiling image, is used according to an exemplary embodiment, features vary remarkably according to the position of the mobile robot 100 and thus it is possible to easily localize the mobile robot 100. In other words, the localization performance of the mobile robot 100 can be improved using a forward image feature.

Figure 2:
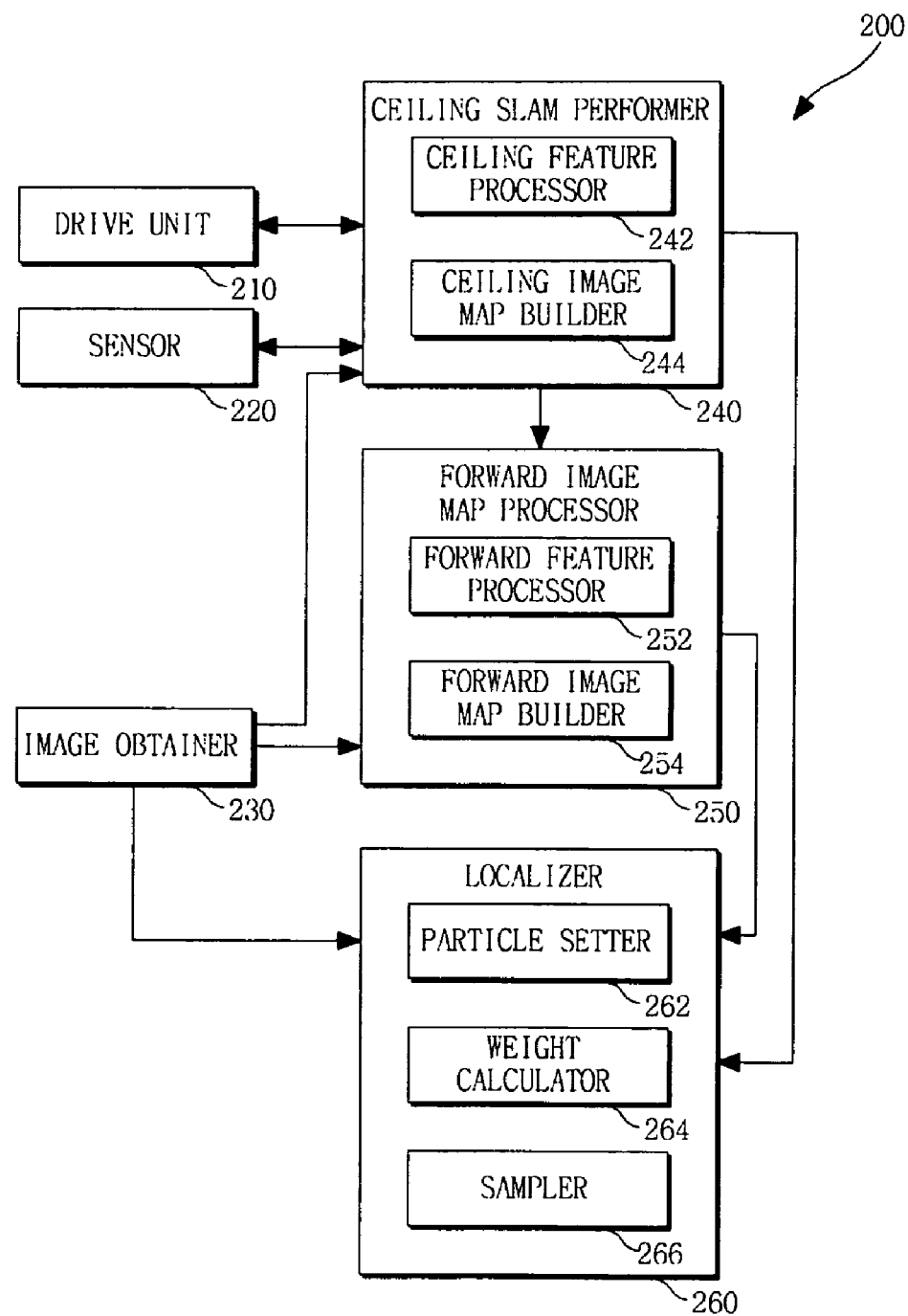
FIG. 2 is a block diagram of an apparatus for localizing a mobile robot according to another exemplary embodiment.

FIG. 2 is a block diagram of an apparatus 200 for localizing a mobile robot according to another exemplary embodiment.

The apparatus 200 for localizing a mobile robot is similar to the apparatus 100 of FIG. 1 except that the SLAM performer 140 is replaced by a ceiling SLAM performer 240. A drive unit 210, a sensor 220, an image obtainer 230 and a forward image map processor 250 have the same constitutions, respectively, as the drive unit 110, the sensor 120, the image obtainer 130 and the forward image map processor 150 of the apparatus 100 of FIG. 1 and thus will not be described again.

The ceiling SLAM performer 240 performs localization using ceiling images and builds a map. The ceiling SLAM performer 240 may include a ceiling feature processor 242 and a ceiling image map builder 244.

The ceiling feature processor 242 extracts features from ceiling images and generates feature descriptors of the extracted features. The ceiling feature processor 242 may extract the features and generate feature descriptors using various feature extraction algorithms, such as SIFT, maximally stable extremal region (MSER), or Harris corner detector. The ceiling image map builder 244 builds a ceiling image map on the basis of the extracted ceiling image features, the feature descriptors, and feature-specific position information.

A localizer 260 performs localization on the basis of the features extracted from ceiling images as well as features extracted from forward images. More specifically, a forward feature processor 252 searches a built forward image map for features matching features extracted from a newly input forward image, and the ceiling feature processor 242 searches the built ceiling image map for features matching features extracted from a newly input ceiling image. Then, the forward feature processor 252 may calculate the estimated position of the mobile robot 200 using the searched forward image features, and the ceiling feature processor 242 may calculate the estimated position of the mobile robot 200 using the searched ceiling image features.

Subsequently, the localizer 260 may perform localization on the basis of the estimated position of the mobile robot 200 calculated from the ceiling image features and the estimated position of the mobile robot 200 calculated from the forward image features. Like the localizer 160 of FIG. 1, the localizer 260 may include a particle setter 262, a weight calculator 264, and a sampler 266.

The particle setter 262 sets particles, which are samples indicating virtual positions of the mobile robot 200, on the basis of posture variation sensed by the sensor 220. The weight calculator 264 may give weights to the particles on the basis of the estimated positions of the mobile robot 200 calculated from the ceiling image features and the forward image features. The sampler 266 re-samples the set particles on the basis of the weights given to the particles. The process of setting particles, giving weights to the particles, and re-sampling the set particles may be repeatedly performed.

The weight calculator 264 may give high weights to particles which exist within a specific range from the estimated position of the mobile robot 200 calculated from a ceiling image and have an angle difference of a specific value or less from the heading angle of the mobile robot 200. Meanwhile, it is possible to obtain feature-specific position information on ceiling image features, rather than on forward image features, and thus the position of the mobile robot 200 can be estimated more accurately using ceiling image features rather than forward image features. Thus, the weight calculator 264 can set the range of particles to which weights are given on the basis of the position estimated from ceiling image features to be smaller than the range of particles to which weights are given on the basis of a position estimated from forward image features. In addition, the weight calculator 264 may give larger weights to particles included in an intersecting set of particles whose weights increase on the basis of the positions of forward image features and particles whose weights increase on the basis of the positions of ceiling image features in comparison with other particles.

Through such an operation, the localizer 260 can roughly localize the mobile robot 200 on the basis of the positions of forward image features, and more accurately localize the mobile robot 200, within the rough position of the mobile robot 200, using ceiling image features in comparison with forward image features.

Meanwhile, the forward image map processor 250 may build a forward image map on the basis of positions of the mobile robot 200 recognized on the basis of the ceiling image map built by the ceiling SLAM performer 240.

In this exemplary embodiment, a forward image map including feature information according to a position at which a mobile robot takes forward images is built and used, and thus it is possible to perform localization using a forward image. Furthermore, by adjusting weights on the basis of features extracted from a ceiling image, it is possible to more accurately localize the mobile robot.

Figure 3:
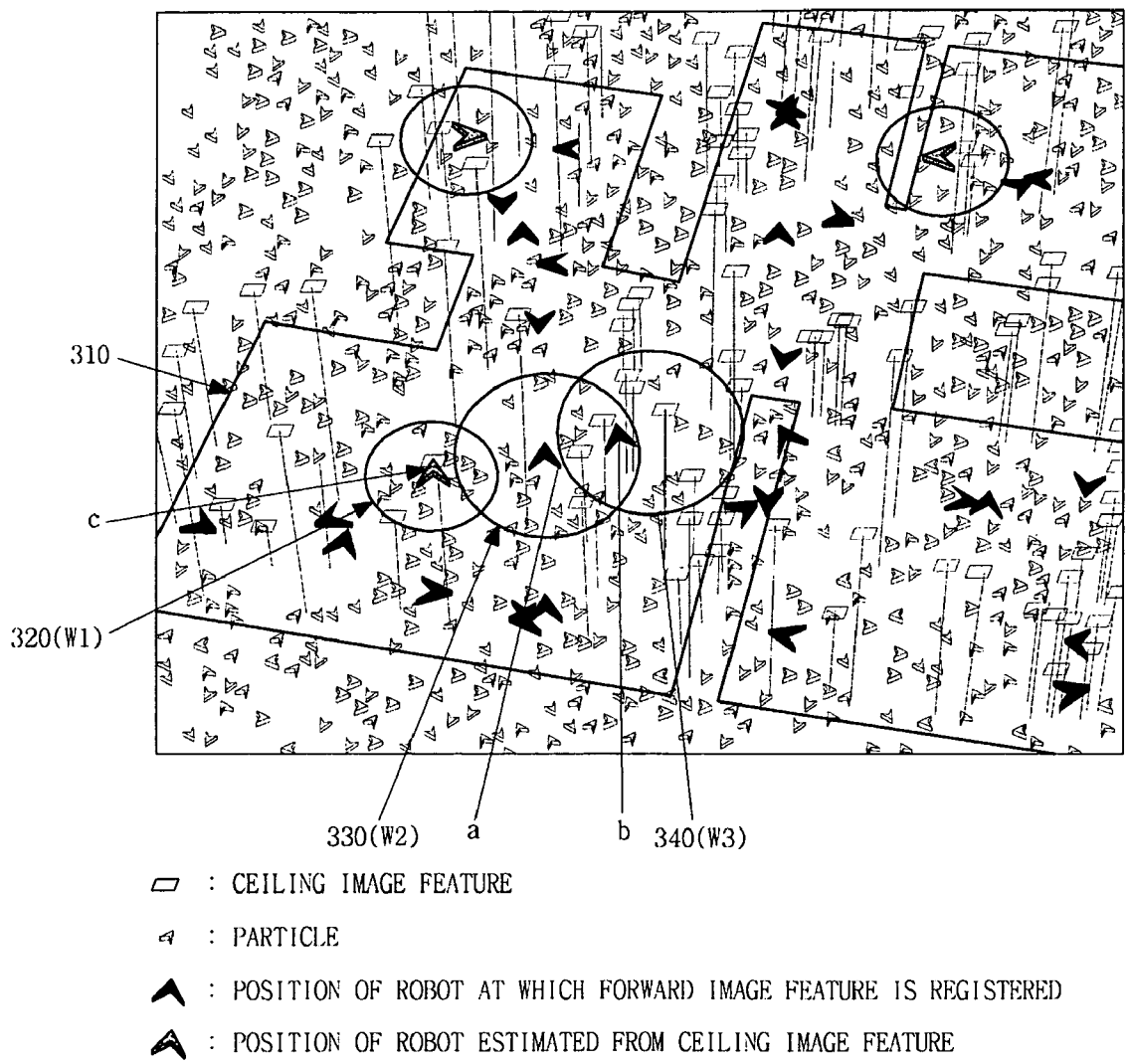
FIG. 3 is a map of features illustrating a method of giving weights to particles according to an exemplary embodiment.

FIG. 3 is a map of features illustrating a method of giving weights to particles according to an exemplary embodiment.

FIG. 3 illustrates particles, which are samples indicating virtual positions of a mobile robot, positions of the robot at which forward image features extracted from forward images are stored (registered), ceiling image features extracted from ceiling images, positions of the robot estimated from the ceiling image features, and an obstacle map. In an obstacle map 310, surroundings of the mobile robot are divided into small grids and the probability of there being an object in each grid is expressed. The obstacle map 310 is also referred to as a grid map or a probability grid map.

For example, when positions of the mobile robot estimated using forward image features extracted from a forward image currently input from the mobile robot are a and b, weights W2 and W3 may be given to particles which exist in spaces 330 and 340 within a specific range from the estimated robot positions a and b and have angle differences of a specific value or less from the heading angle of the robot. In addition, a weight W1 may be given to particles which exist in a space 320 within a specific range from a position c of the mobile robot estimated from a ceiling image currently input from the robot and have an angle difference of a specific value or less from the heading angle of the mobile robot.

Considering that localization using ceiling image features may be more accurate than localization using forward images, the space 320 for the position c of the mobile robot estimated from a ceiling image may be set to be smaller than the spaces 330 and 340 for the positions a and b estimated from forward images. The weight W1, given to particles, may be larger than the weight W2 or W3. In addition, a weight larger than the weights W1, W2 or W3 may be given to particles included in both the spaces 320 and 330.

Figure 4:
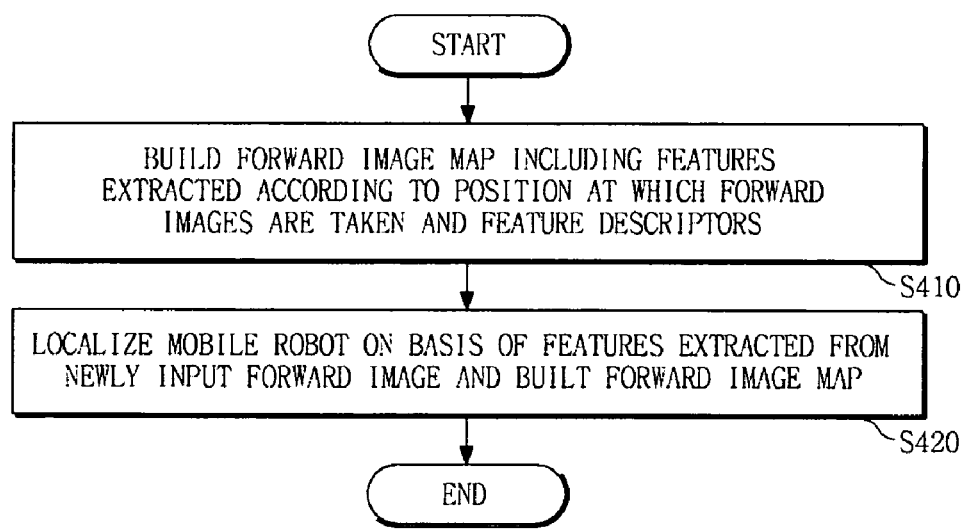
FIG. 4 is a flowchart showing a method of localizing a mobile robot according to an exemplary embodiment.

FIG. 4 is a flowchart showing a method of localizing a mobile robot according to an exemplary embodiment.

A forward image map including features extracted from forward images obtained by a mobile robot according to a position at which the forward images are taken and feature descriptors of the extracted features, is built (S410). The built forward image map may be stored in a specific storage space. The forward image map may be updated every time the mobile robot moves a specific distance, and completed. The features may be extracted from the forward images regardless of scale. In addition, the forward image map may be built on the basis of positions of the mobile robot recognized on the basis of a ceiling image map built by ceiling SLAM.

When a new forward image is input, the mobile robot is localized on the basis of features extracted from the new forward image and the forward image map (S420). In this localization process, the estimated position of the mobile robot can be calculated using features of previous forward images matching the features extracted from the newly input forward image.

In the localization operation (S420), the following process may be repeatedly performed. First, particles which are samples indicating virtual positions of the mobile robot are set up. Features of the forward image map matching the features extracted from the input forward image are searched for. Subsequently, the estimated position of the mobile robot is calculated using the search result, and weights are given to the particles on the basis of the estimated position of the mobile robot. The particles are re-sampled on the basis of the weights given to the particles.

When weights are given to the particles, weights of particles that exist within a specific range from the estimated position of the mobile robot and have an angle difference of a specific value or less from the heading angle of the mobile robot may be increased. When the estimated position of the mobile robot is calculated by ceiling SLAM, weights may be given to the particles on the basis of the estimated position of the mobile robot calculated from features of a forward image and the estimated position of the mobile robot calculated from features of a ceiling image.

Figure 5:
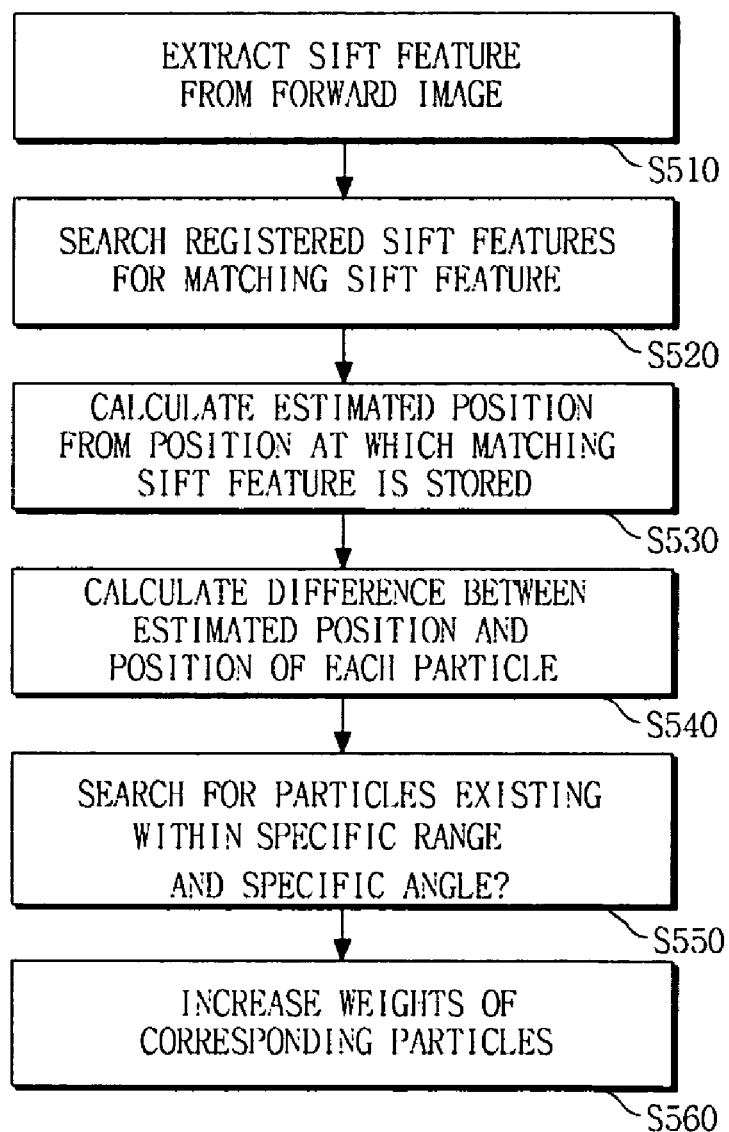
FIG. 5 is a detailed flowchart showing a localization method using a forward image according to an exemplary embodiment.

FIG. 5 is a detailed flowchart showing a localization method using a forward image according to an exemplary embodiment.

SIFT features are extracted from a forward image (S510). Features matching the extracted SIFT features are searched for among SIFT features registered in a forward image map (S520).

The estimated position of a mobile robot is calculated from positions at which the matched SIFT features are stored (S530).

A difference between the estimated position and the position of each particle is calculated (S540). Particles existing within a specific range and a specific angle from the estimated position are searched for (S550). The weights of the particles existing within the specific range and the specific angle are increased, and re-sampling is performed (S560). By repeating operations 510 to 560, the optimum position of the mobile robot is recognized.

Figure 6:
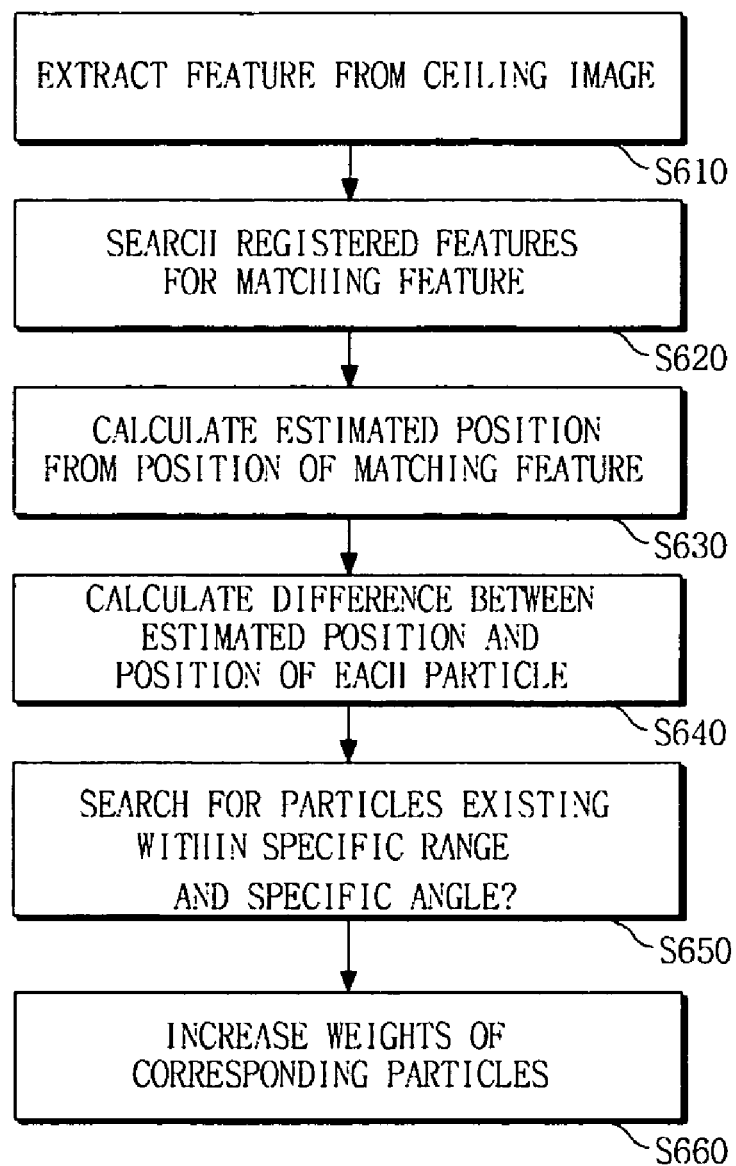
FIG. 6 is a detailed flowchart showing a localization method using a ceiling image according to an exemplary embodiment.

FIG. 6 is a detailed flowchart showing a localization method using a ceiling image according to an exemplary embodiment.

Features are extracted from a ceiling image (S610). Features matching the extracted features are searched for among features registered in a ceiling image map (S620).

The estimated position of a mobile robot is calculated from the positions of the matching features (S630).

A difference between the estimated position and the position of each particle is calculated (S640). Particles existing within a specific range and a specific angle from the estimated position are searched for (S650). The weights of the particles existing within the specific range and the specific angle are increased, and re-sampling is performed (S660). By repeating operations 610 to 660, the optimum position of the mobile robot is recognized. As described above, it is possible to rapidly and accurately localize a mobile robot using both of the localization methods using a forward image and a ceiling image.

The above method according to the present embodiment may be implemented through one or more processor devices and/or using computer readable code stored in any form of recording media, such as CD-ROM, RAM, ROM, floppy disk, hard disk, or magneto-optical disk, or in any computer-readable form, such as computer code organized into executable programs. A method of storing an exemplary embodiment is well known in the art and thus its description will be omitted.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An apparatus for localizing a mobile robot, comprising:
a forward image map processor for building a forward image map including features extracted from forward images captured by the mobile robot according to a position at which the forward images are taken and feature descriptors of the extracted features, wherein the forward images include an image captured from a space ahead of a direction in which the robot is traveling; and
a localizer for, when a new forward image is input, localizing the mobile robot on the basis of a feature extracted from the new forward image and the forward image map, and for setting particles, which are samples indicating virtual positions of the mobile robot, giving weights to the particles on the basis of the estimated position, and re-sampling the particles on the basis of the weights given to the particles to localize the mobile robot and increasing weights of particles existing within a specific range from the estimated position of the mobile robot and having an angle difference of a specific value or less from a heading angle of the mobile robot when giving weights to the particles on the basis of the estimated position.

2. The apparatus of claim 1, wherein the forward image map processor searches the forward image map for a feature of the previous forward images matching the feature extracted from the new forward image and information on a position at which a previous forward image including the matching feature is taken, and calculates an estimated position of the mobile robot using the search result.

3. The apparatus of claim 1, wherein the forward image map processor updates the forward image map when the mobile robot moves a specific distance.

4. The apparatus of claim 1, wherein the features extracted from the forward images are extracted regardless of scale.

5. The apparatus of claim 1, wherein the forward image map processor compares a size of the searched feature of the previous forward image with a size of the feature extracted from the new forward image and corrects the estimated position of the mobile robot, and the localizer gives weights to the particles on the basis of the corrected estimated position.

6. The apparatus of claim 1, further comprising:
a ceiling simultaneous localization and mapping (SLAM) performer for performing localization and map building on the basis of ceiling images,
wherein the ceiling SLAM performer includes:
a ceiling feature processor for extracting features from the ceiling images and generating feature descriptors of the extracted features; and
a ceiling image map builder for building a ceiling image map on the basis of the extracted ceiling image features and the feature descriptors of the extracted features.

7. The apparatus of claim 6, wherein the ceiling SLAM performer searches the ceiling image map for a ceiling image feature matching a feature extracted from a newly input ceiling image and calculates an estimated position of the mobile robot using the search result, and the localizer gives weights to particles on the basis of the estimated position of the mobile robot calculated from the feature of the forward image and the estimated position of the mobile robot calculated from the feature of the ceiling image.

8. The apparatus of claim 7, wherein when the localizer gives the weights to the particles, a range of particles to which weights are given on the basis of the estimated position of the mobile robot calculated from the feature of the forward image is larger than a range of particles to which weights are given on the basis of the estimated position of the mobile robot calculated from the feature of the ceiling image.

9. The apparatus of claim 7, wherein the localizer increases weights of particles included in an intersection set of particles to which weights are given on the basis of the estimated position of the mobile robot calculated from the feature of the forward image and particles to which weights are given on the basis of the estimated position of the mobile robot calculated from the feature of the ceiling image.

10. The apparatus of claim 6, wherein the forward image map processor builds the forward image map on the basis of the estimated position of the mobile robot calculated on the basis of the ceiling image map built by the ceiling SLAM performer.

11. A method of localizing a mobile robot comprising a processor, the method comprising:
building, under control of the processor, a forward image map including features extracted from forward images captured by the mobile robot according to a position at which the forward images are taken and feature descriptors of the extracted features, wherein the forward images include an image captured from a space ahead of a direction in which the robot is traveling; and
when a new forward image is input, localizing the mobile robot on the basis of a feature extracted from the new forward image and the forward image map, and setting particles, which are samples indicating virtual positions of the mobile robot, giving weights to the particles on the basis of the estimated position, and re-sampling the particles on the basis of the weights given to the particles to localize the mobile robot and increasing weights of particles existing within a specific range from the estimated position of the mobile robot and having an angle difference of a specific value or less from a heading angle of the mobile robot when giving weights to the particles on the basis of the estimated position.

12. The method of claim 11, wherein the localizing of the mobile robot includes:
searching the forward image map for a feature of the previous forward images matching the feature extracted from the new forward image and information on a position at which a previous forward image including the searched feature was taken; and
calculating an estimated position of the mobile robot using the search result.

13. The method of claim 11, wherein the building of the forward image map comprises updating the forward image map when the mobile robot moves a specific distance.

14. The method of claim 11, wherein the features extracted from the forward images are extracted regardless of scale.

15. The method of claim 11, further comprising:
extracting features from ceiling images and generating feature descriptors of the extracted features; and
building a ceiling image map on the basis of the features extracted from the ceiling images,
wherein the localizing of the mobile robot further includes:
searching the ceiling image map for a ceiling image feature matching a feature extracted from an input ceiling image, and calculating an estimated position of the mobile robot using the search result; and
giving weights to the particles on the basis of the estimated position of the mobile robot calculated from the feature of the forward image and the estimated position of the mobile robot calculated from the feature of the ceiling image.

16. The method of claim 15, wherein building a forward image map comprises building the forward image map on the basis of the estimated position of the mobile robot estimated on the basis of the built ceiling image map.

* * * * *